(12) United States Patent
Kitamura et al.

(10) Patent No.: US 8,309,488 B2
(45) Date of Patent: Nov. 13, 2012

(54) EXHAUST GAS PURIFYING CATALYST

(75) Inventors: Ichiro Kitamura, Kakegawa (JP);
Kenichi Taki, Kakegawa (JP); Akimasa Hirai, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 83 days.

(21) Appl. No.: 11/995,981

(22) PCT Filed: Jul. 18, 2006

(86) PCT No.: PCT/JP2006/314182
§ 371 (c)(1),
(2), (4) Date: Feb. 5, 2008

(87) PCT Pub. No.: WO2007/010899
PCT Pub. Date: Jan. 25, 2007

(65) Prior Publication Data
US 2009/0124492 A1    May 14, 2009

(30) Foreign Application Priority Data
Jul. 21, 2005  (JP) .................. 2005-211494

(51) Int. Cl.
*B01J 23/00* (2006.01)
*B01J 21/00* (2006.01)
*B01J 20/00* (2006.01)
*B01D 50/00* (2006.01)
*B01D 53/34* (2006.01)

(52) U.S. Cl. ........ 502/326; 502/304; 502/327; 502/332; 502/333; 502/334; 502/339; 502/349; 502/355; 502/439; 502/527.12; 502/527.13

(58) Field of Classification Search .................. None
See application file for complete search history.

(56) References Cited

U.S. PATENT DOCUMENTS
3,897,368 A   7/1975  Ohara et al.
(Continued)

FOREIGN PATENT DOCUMENTS
EP    0707883  *  6/1994
(Continued)

OTHER PUBLICATIONS
European Search Report connection with the corresponding Japanese Patent Application, dated Oct. 13, 2011.

*Primary Examiner* — Melvin C Mayes
*Assistant Examiner* — Sheng H Davis
(74) *Attorney, Agent, or Firm* — Davis & Bujold, PLLC

(57) ABSTRACT

An exhaust gas purifying catalyst includes a catalyst substrate and a catalyst coating layer containing a noble metal and a refractory inorganic oxide. The catalyst coating layer includes an upstream portion located upstream and a downstream portion located downstream in a flow direction of an exhaust gas. The upstream portion has a layered structure including an upstream portion inside layer containing a cerium-zirconium composite oxide in which a relative proportion of $CeO_2$ is 50 to 95 wt %, as the refractory inorganic oxide and an upstream portion outside layer containing a cerium-zirconium composite oxide in which a relative proportion of $ZrO_2$ is 50 to 95 wt %, as the refractory inorganic oxide. The upstream portion outside layer and the downstream portion contain Rh as the noble metal, and an amount of Rh contained in the upstream portion outside layer is larger than an amount of Rh contained in the downstream portion.

13 Claims, 5 Drawing Sheets

U.S. PATENT DOCUMENTS

| | | | |
|---|---|---|---|
| 4,118,199 A | 10/1978 | Volker et al. | |
| 6,087,298 A | 7/2000 | Sung et al. | |
| 2003/0061860 A1 | 4/2003 | Hu et al. | |
| 2004/0001781 A1 | 1/2004 | Kumar et al. | |
| 2005/0031501 A1 | 2/2005 | Kawai et al. | |
| 2006/0251549 A1* | 11/2006 | Kumar et al. | 422/180 |

FOREIGN PATENT DOCUMENTS

| | | |
|---|---|---|
| EP | 0 852 966 A1 | 7/1997 |
| JP | 9-131530 | 5/1997 |
| JP | 10-296085 | 11/1998 |
| JP | 2000-301000 | 10/2000 |
| JP | 2001-70792 | 3/2001 |
| JP | 2001-162166 | 6/2001 |
| JP | 3235640 B2 | 12/2001 |
| JP | 2003-326170 | 11/2003 |
| JP | 2004-283692 | 10/2004 |
| JP | 2004-298813 | 10/2004 |

* cited by examiner

US 8,309,488 B2

EXHAUST GAS PURIFYING CATALYST

TECHNICAL FIELD

The present invention relates to an exhaust gas purifying catalyst that removes toxic substances contained in exhaust gas from an internal combustion engine of an automobile, a motorcycle, and others.

BACKGROUND ART

An exhaust gas purifying catalyst is formed by coating a substrate made of ceramics or the like with a catalyst coating layer containing a refractory inorganic oxide and a noble metal. These days, most of catalysts are three-way catalysts that purify HC, CO and NOx at the same time.

One of properties required for an exhaust gas purifying catalyst is a property to be activated rapidly after engine start even in a low temperature range (i.e., ignition performance: low-temperature activation property). Researches have been performed to improve ignition performance of exhaust gas purifying catalysts, for example, by providing a catalyst layer with a two-layer structure (see Patent Documents 1 to 4).

For example, claim 1 of Publication of Japanese Patent No. 3235640 (Patent Document 1) recites that an inside layer of a catalyst layer contains a cerium-zirconium composite oxide with a weight ratio of 100/2 to 100/80 in terms of cerium/zirconium oxide, and an outside layer of the catalyst layer contains a cerium-zirconium composite oxide with a weight ratio of 2/100 to 100/100 in terms of cerium/zirconium oxide.

Claim 1 of Publication of Japanese Unexamined Patent Application No. 2004-298813 (Patent Document 2) recites that an inside layer of a catalyst layer is a composite ceramic containing platinum-supported alumina constituted by porous alumina supported with platinum component and an oxygen storing ceria-zirconia composite oxide, and an outside layer of the catalyst layer is a composite ceramic containing: at least one of rhodium supported ceria-zirconia composite oxide and rhodium supported alumina, each constituted by a low thermally degradable ceria-zirconia composite oxide or a porous alumina supported with rhodium component; and at least one of a porous alumina and a low thermally degradable ceria-zirconia composite oxide.

Claim 5 of Publication of Japanese Unexamined Patent Application No. 2001-70792 (Patent Document 3) recites that an inside layer of a catalyst layer contains palladium, and an outside layer contains both of a zirconium-based composite oxide coexistently supported with rhodium and platinum, and a cerium-based composite oxide coexistently supported with rhodium and platinum.

Claims 1 and 2 of Publication of Japanese Unexamined Patent Application No. 10-296085 (Patent Document 4) recites that an inside layer of a catalyst layer is constituted by a refractory inorganic oxide including active alumina as a main component, Ce, Zr, Pd, and Ba, and has a Ce/Zr mol ratio of 85/15 to 30/70. An outside layer of the catalyst layer is constituted by a refractory inorganic oxide including active alumina as a main component, at least one selected from Ce, Zr and their compounds, and Rh, and has a Ce/Zr mol ratio of 0/100 to 25/75.

Patent Document 1: Publication of Japanese Patent No. 3235640
Patent Document 2: Publication of Japanese Unexamined Patent Application No. 2004-298813
Patent Document 3: Publication of Japanese Unexamined Patent Application No. 2001-70792
Patent Document 4: Publication of Japanese Unexamined Patent Application No. 10-296085

DISCLOSURE OF THE INVENTION

Problems to be Solved by the Invention

However, further improvement in ignition performance is required these days due to worldwide tightening of regulations on automobile exhaust gas emission.

The present invention, which has been made in view of the above circumstances, has an object to provide an exhaust gas purifying catalyst which has an improved ignition performance.

Means to Solve the Problems (1) The invention according to claim 1 provides an exhaust gas purifying catalyst which includes a catalyst substrate; and a catalyst coating layer containing a noble metal and a refractory inorganic oxide, and formed on the catalyst substrate. The catalyst coating layer includes an upstream portion located upstream and a downstream portion located downstream in a flow direction of an exhaust gas. The upstream portion has a layered structure including an upstream portion inside layer and an upstream portion outside layer. The upstream portion inside layer contains a cerium-zirconium composite oxide in which a relative proportion of $CeO_2$ is 50 to 95 wt %, as the refractory inorganic oxide and the upstream portion outside layer, contains a cerium-zirconium composite oxide in which a relative proportion of $ZrO_2$ is 50 to 95 wt %, as the refractory inorganic oxide. The upstream portion outside layer and the downstream portion contain Rh as the noble metal, and an amount of Rh contained in the upstream portion outside layer is larger than an amount of Rh contained in the downstream portion.

According to the exhaust gas purifying catalyst of the present invention, the cerium-zirconium composite oxide in which a relative proportion of $CeO_2$ is 50 to 95 wt % (hereinafter referred to as the "Ce rich composite oxide") in the upstream inside layer of the upstream portion in the catalyst coating layer adsorbs exhaust gas components in an exhaust gas. The noble metal contained in the catalyst coating layer (particularly Rh contained in the upstream portion outside layer) degrades adsorbed CO.

Due to the above described action, the exhaust gas purifying catalyst of the present invention may achieve a high exhaust gas purifying performance, and particularly may achieve a high ignition performance. Specifically, since the Ce rich composite oxide is contained in the upstream portion inside layer in the present invention, a higher exhaust gas purifying performance and a higher ignition performance may be achieved.

According to the present invention, since the amount of Rh contained in the upstream portion outside layer is larger than the amount of Rh contained in the downstream portion, exhaust gas components may be further effectively purified.

In the present invention, the upstream portion inside layer as a whole is in a Ce rich state as compared with Zr, and preferably contains only Ce rich composite oxide (without containing Zr rich composite oxide).

Also, the upstream portion outside layer as a whole is in a Zr rich state as compared with Ce, and preferably contains only Zr rich composite oxide (without containing Ce rich composite oxide).

There is no particular limitation to the catalyst substrate as long as the catalyst substrate is usually used for an exhaust gas purifying catalyst. For example, a honeycomb substrate, a corrugated substrate, and a monolith honeycomb substrate may be employed. The catalyst substrate may be made of any refractory material. For example, an integrally structured substrate made of refractory ceramic, such as cordierite, or of metal, such as ferrite stainless steel, may be employed.

The noble metal may be, for example, Rh, Pd or Pt. The noble metal contained in the upstream portion outside layer may be Rh only or may be a combination of Rh and another metal. The noble metal contained in the upstream portion inside layer is preferably one or a combination of two or more selected from Rh, Pd and Pt. The noble metal contained in the downstream portion is preferably one or a combination of two or more selected from Rh, Pd and Pt.

The refractory inorganic oxide may be, for example, alumina (particularly active alumina), Zr oxide, Ce oxide, ZrCe composite oxide, silica and titania. A preferable amount of the refractory inorganic oxide is within a range of 100-300 g per liter of the catalyst.

A proportion of the amount of Rh contained in the upstream portion outside layer to an amount of Rh contained in the downstream portion is preferably within a range of 1:0.05 to 0.9, and more preferably within a range of 1:0.1 to 0.7. The catalyst coating layer may contain Ba, La, Nd, Pr or Y. It is particularly preferable to contain Ba and/or La. A preferable amount of Ba and/or La is 0 to 30 g per liter of the catalyst.

An area ratio, or a length ratio in the flow direction of the exhaust gas, between the upstream portion and the downstream portion is preferably within a range of 1:0.2 to 5.

The exhaust gas purifying catalyst in the present invention may be formed, for example, with a single catalyst substrate and a catalyst coating layer formed on the catalyst substrate. In this case, each of an upstream portion and a downstream portion may be formed on the single catalyst substrate. The upstream portion, which may be located upstream from the downstream portion, is preferably an area including an end surface of the exhaust gas purifying catalyst as an entrance of an exhaust gas. The downstream portion, which may be located downstream from the upstream portion, is preferably an area including an end surface of the exhaust gas purifying catalyst as an exit of an exhaust gas.

The exhaust gas purifying catalyst in the present invention may include a combination of two or more catalyst substrates. In this case, an upstream portion may be provided on a surface of a certain catalyst substrate and a downstream portion may be provided on a surface of the remaining catalyst substrate. The catalyst substrate on which the upstream portion is provided may be disposed on an upstream side, while the catalyst substrate on which the downstream portion is provided may be disposed on a downstream side in the flow direction of the exhaust gas.

The catalyst coating layer in the present invention may be constituted by only two portions of an upstream portion and a downstream portion, or may include another area, for example, upstream from the upstream portion, between the upstream portion and the downstream portion, or downstream from the downstream portion.

The upstream portion of the catalyst coating layer may be constituted by two layers of an upstream portion inside layer and an upstream portion outside layer, or may further include another layer. The another layer may be provided inside of the upstream portion inside layer, between the upstream portion inside layer and the upstream portion outside layer, or outside of the upstream portion outside layer.

(2) The invention according to claim 2 provides the exhaust gas purifying catalyst as set forth in claim 1 wherein the downstream portion contains, as a refractory inorganic oxide, a cerium-zirconium composite oxide in which a relative proportion of $ZrO_2$ is 50 to 95 wt %.

The exhaust gas purifying catalyst of the present invention has a further high exhaust gas purifying performance due to the above described structure.

In the present invention, the downstream portion as a whole is in a Zr rich state as compared with Ce, and preferably contains only Zr rich composite oxide (without containing Ce rich composite oxide).

(3) The invention according to claim 3 provides the exhaust gas purifying catalyst as set forth in claim 1 or 2 wherein the downstream portion has a layered structure including a downstream portion inside layer and a downstream portion outside layer, and wherein the downstream portion inside layer and the downstream portion outside layer are different in the following (A) and/or (B):(A) a type and/or a concentration of the noble metal; and (B) a type of the refractory inorganic oxide.

In the exhaust gas purifying catalyst of the present invention, the downstream portion inside layer and the downstream portion outside layer in the catalyst coating layer may be different in the above (A), or (B), or both of (A) and (B). This allows various designs of properties of the exhaust gas purifying catalyst depending on purposes.

The downstream portion of the catalyst coating layer may be constituted by two layers of a downstream portion inside layer and a downstream portion outside layer, or may further include another layer. The another layer may be provided inside of the downstream portion inside layer, between the downstream portion inside layer and the downstream portion outside layer, or outside of the downstream portion outside layer.

(4) The invention according to claim 4 provides the exhaust gas purifying catalyst as set forth in claim 3 wherein the downstream portion outside layer contains Rh as the noble metal.

The exhaust gas purifying catalyst of the present invention has a further high exhaust gas purifying performance since the downstream portion outside layer contains Rh.

(5) The invention according to claim 5 provides the exhaust gas purifying catalyst as set forth in one of claims 1 to 4 wherein a coating amount per unit volume of the catalyst coating layer is smaller in the upstream portion than in the downstream portion.

In the exhaust gas purifying catalyst of the present invention, since the upstream portion has a smaller coating amount per unit volume of the catalyst coating layer, the upstream portion has a low heat capacity and is heated up to thereby achieve an improved catalytic activity in a short time after engine start. Accordingly, the exhaust gas purifying catalyst of the present invention has a further high ignition performance.

The ratio in the coating amount per unit volume of the catalyst coating layer between the upstream portion and the downstream portion is preferably within a range of 1:1 to 5, and more preferably within a range of 1:1.1 to 2.0.

(6) The invention according to claim 6 provides the exhaust gas purifying catalyst as set forth in one of claims 1 to 5 wherein the noble metal is contained mainly in an external region of the upstream portion outside layer.

The exhaust gas purifying catalyst of the present invention has a further high exhaust gas purifying performance (particularly ignition performance) since the noble metal (for example, Rh) is contained mainly in the external region of the upstream portion outside layer.

Being contained mainly in the external region means, for example, that when the thickness of the upstream portion outside layer is indicated by "T", 80 wt % or more of the noble metal contained in the upstream portion outside layer is located in a region from the surface to a depth $\alpha T$ ($\alpha$ is 0.1 to 0.2) of the upstream portion outside layer.

EXPLANATION OF REFERENCE NUMERALS

Figure 1:
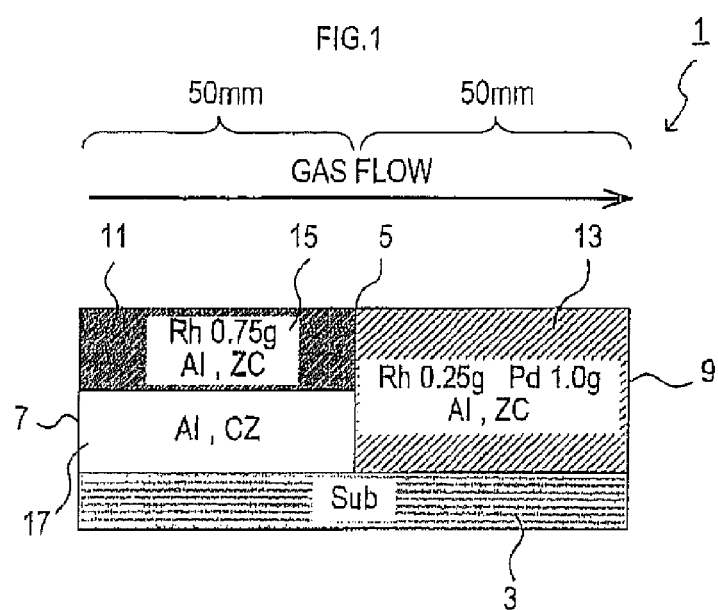
[FIG. 1] is an explanatory diagram showing a structure of an exhaust gas purifying catalyst according to a first embodiment of the present invention.

1 . . . exhaust gas purifying catalyst
3 . . . substrate
5 . . . catalyst coating layer
7 . . . entrance end
9 . . . exit end
11 . . . upstream portion
13 . . . downstream portion
13a . . . downstream portion inside layer
13b . . . downstream portion outside layer
15 . . . upstream portion outside layer
17 . . . upstream portion inside layer

BEST MODE FOR CARRYING OUT THE INVENTION

The present invention will be specifically explained hereinafter by way of embodiments.

Embodiment 1 a) A description will now be given on a structure of an exhaust gas purifying catalyst 1 of an Embodiment 1 with reference to FIG. 1. In FIG. 1 and later-described FIGS. 2 through 14, "CZ" represents a Ce rich composite oxide, "ZC" represents a Zr rich composite oxide, "Al" represents alumina, and "Sub" represents a substrate.

The exhaust gas purifying catalyst 1 is constituted by a substrate (a catalyst substrate) 3 and a catalyst layer 5 formed on a surface of the substrate 3. The substrate 3 is a monolith honeycomb substrate having a length of 100 mm, a capacity of 1.0 L and a cell density of 900 cells/in$^2$. The catalyst coating layer 5 is formed on an inner face of each cell of the substrate 3. In FIG. 1, a left end is an entrance end 7 of the cell and a right end is an exit end 9 of the cell. Accordingly, a direction from the entrance end 7 to the exit end 9 is a flow direction of exhaust gas. (Although a gas flow is indicated by an arrow only in FIG. 1, the same is applicable to the other figures.)

The catalyst coating layer 5 includes an upstream portion 11 over an area of 50 mm from the entrance end 7 and a downstream portion 13 over an area of 50 mm from the exit end 9 (that is, a portion from a most downstream end of the upstream portion 11 to the exit end 9). Also, the upstream portion 11 includes an upstream portion outside layer 15 and an upstream portion inside layer 17.

The upstream portion outside layer 15 includes Rh (0.75 g) as a noble metal, alumina and a Zr rich composite oxide. The upstream portion inside layer 17 includes alumina and a Ce rich composite oxide (a refractory inorganic oxide). The downstream portion 13 includes Rh (0.25 g) and Pd (1.0 g) as noble metals, alumina and a Zr rich composite oxide (a refractory inorganic oxide).

b) A description will now be given on a method of manufacturing the exhaust gas purifying catalyst 1 of the Embodiment 1.

Slurries S1A, S1B and S1C were prepared as below.

(Slurry S1A)

Below listed components (fine powder; the same applies below) were mixed to prepare the slurry S1A.

alumina: 25 g
Ce rich composite oxide (with a relative proportion of $CeO_2$ of 80 wt %): 25 g
water: 50 g (Slurry S1B)

Below listed components were mixed to prepare the slurry S1B.

alumina: 25 g
Zr rich composite oxide (with a relative proportion of $ZrO_2$ of 80 wt %): 25 g
Rh nitrate solution: an amount containing 0.75 g of Rh
water: 50 g (Slurry S1C)

Below listed components were mixed to prepare the slurry S1C.

alumina: 50 g
Zr rich composite oxide (with a relative proportion of $ZrO_2$ of 80 wt %): 50 g
Rh nitrate solution: an amount containing 0.25 g of Rh
Pd nitrate solution: an amount containing 1.0 g of Pd
water: 100 g 50 g of the slurry S1A was applied to coat a cell of the substrate 3 over an area of 50 mm from the entrance end 7, dried at 250° C. for an hour, and calcined at 500° C. for an hour. The upstream portion inside layer 17 was formed by this step.

The same conditions of drying and calcinations are applicable hereinafter. In the present description, an amount of a coating of slurry means a weight of solid materials.

Subsequently, 50.75 g of the slurry S1B (containing 0.75 g of Rh) was applied to coat the area where the slurry S1A was already be applied, dried at 250° C. for an hour, and calcined at 500° C. for an hour. The upstream portion outside layer 15 was formed by this step.

Then, 101.25 g of the slurry S1C (containing 0.25 g of Rh and 1.0 g of Pd) was applied to coat the cell of the substrate 3 over an area of 50 mm from the exit end 9 (that is, a portion where the slurry S1A or S1B was not coated), dried at 250° C. for an hour, and was calcined at 500° C. for an hour. The downstream portion 13 was formed by this step, and thus the exhaust gas purifying catalyst 1 was completed.

Embodiment 2

Figure 2:
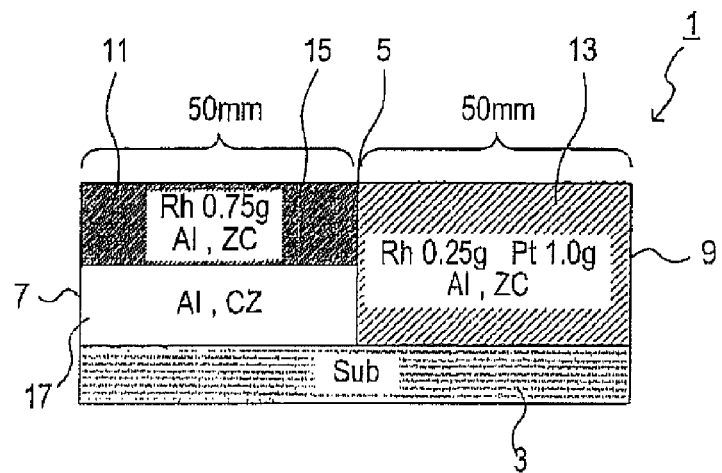
[FIG. 2] is an explanatory diagram showing a structure of an exhaust gas purifying catalyst according to a second embodiment.

An exhaust gas purifying catalyst 1 of an Embodiment 2 has basically the same structure as that of the Embodiment 1, as shown in FIG. 2. The Embodiment 2 is different from the Embodiment 1 in amounts of the noble metals contained in the downstream portion 13, that is, Rh: 0.25 g and Pt: 1.0 g.

A method of manufacturing the exhaust gas purifying catalyst 1 of the Embodiment 2 is basically the same as in the Embodiment 1. In the Embodiment 2, a slurry S2 prepared by mixing below listed components was used in place of the slurry S1C.

(Slurry S2)
    alumina: 50 g
    Zr rich composite oxide (with a relative proportion of $ZrO_2$ of 80 wt %) 50 g
    Rh nitrate solution: an amount containing 0.25 g of Rh
    Pt nitrate solution: an amount containing 1.0 g of Pt
    water: 100 g In the Embodiment 2, 101.25 g of the slurry S2 (containing 0.25 g of Rh and 1.0 g of Pt) was applied to the cell of the substrate 3 over an area of 50 mm from the exit end 9, dried and calcined to form the downstream portion 13. The method of forming the upstream portion 11 is the same as in the Embodiment 1.

Embodiment 3

Figure 3:
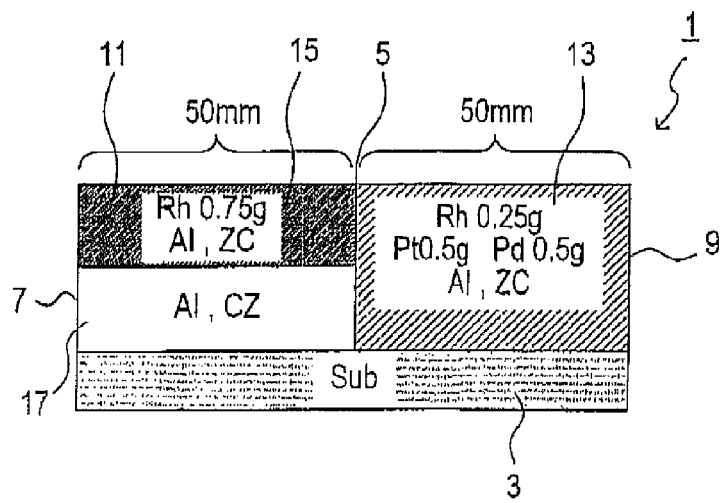
[FIG. 3] is an explanatory diagram showing a structure of an exhaust gas purifying catalyst according to a third embodiment.

An exhaust gas purifying catalyst 1 of an Embodiment 3 has basically the same structure as that of the Embodiment 1, as shown in FIG. 3. The Embodiment 3 is different from the Embodiment 1 in amounts of the noble metals contained in the downstream portion 13, that is, Rh: 0.25 g, Pt: 0.5 g and Pd 0.5 g.

A method of manufacturing the exhaust gas purifying catalyst 1 of the Embodiment 3 is basically the same as in the Embodiment 1. In the Embodiment 3, a slurry S3 prepared by mixing below listed components was used in place of the slurry S1C.

(Slurry S3)
    alumina: 50 g
    Zr rich composite oxide (with a relative proportion of $ZrO_2$ of 80 wt %): 50 g
    Rh nitrate solution: an amount containing 0.25 g of Rh
    Pd nitrate solution: an amount containing 0.5 g of Pd
    Pt nitrate solution: an amount containing 0.5 g of Pt
    water: 100 g In the Embodiment 3, 101.25 g of the slurry S3 (containing 0.25 g of Rh, 0.5 g of Pd and 0.5 g of Pt) was applied to the cell of the substrate 3 over an area of 50 mm from the exit end 9, dried and calcined to form the downstream portion 13. The method of forming the upstream portion 11 is the same as in the Embodiment 1.

Embodiment 4

Figure 4:
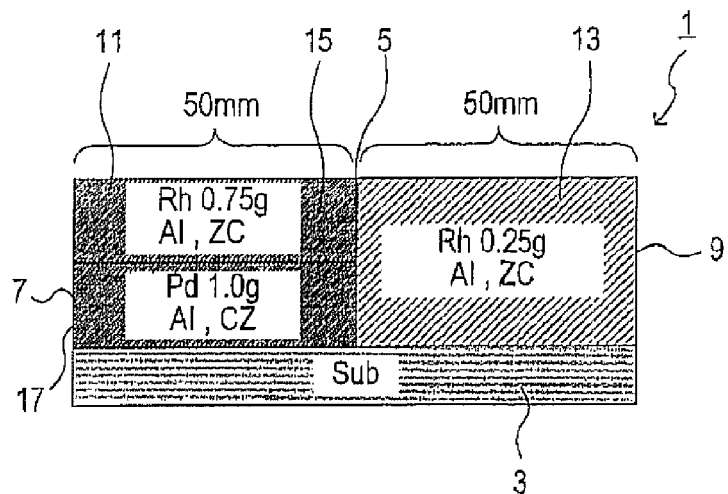
[FIG. 4] is an explanatory diagram showing a structure of an exhaust gas purifying catalyst according to a fourth embodiment.

An exhaust gas purifying catalyst 1 of an Embodiment 4 has basically the same structure as that of the Embodiment 1, as shown in FIG. 4. The Embodiment 4 is different from the Embodiment 1 in that 1.0 g of Pd as the noble metal is contained in the upstream portion inside layer 17 and 0.25 g of Rh is the only noble metal contained in the downstream portion 13.

A method of manufacturing the exhaust gas purifying catalyst 1 of the Embodiment 4 is basically the same as in the Embodiment 1. In the Embodiment 4, a slurry S4A prepared by mixing below listed components was used in place of the slurry S1A. Also, a slurry S4B prepared by mixing below listed components was used in place of the slurry S1C.

(Slurry S4A)
    alumina: 25 g
    Ce rich composite oxide (with a relative proportion of $CeO_2$ of 80 wt %): 25 g
    Pd nitrate solution: an amount containing 1.0 g of Pd
    water: 50 g (Slurry S4B)
    alumina: 50 g
    Zr rich composite oxide (with a relative proportion of $ZrO_2$ of 80 wt %): 50 g
    Rh nitrate solution: an amount containing 0.25 g of Rh
    water: 100 g In the Embodiment 4, 51 g of the slurry S4A (containing 1.0 g of Pd) was applied, in place of the slurry S1A, to coat the cell of the substrate 3 over an area of 50 mm from the entrance end 7, dried and calcined to form the upstream portion inside layer 17.

Also, 100.25 g of the slurry S4B (containing 0.25 g of Rh) was applied, in place of the slurry S1C, to coat the cell of the substrate 3 over an area of 50 mm from the exit end 9, dried and calcined to form the downstream portion 13

A method of forming the upstream portion outside layer 15 after forming the upstream portion inside layer 17 is the same as in the Embodiment 1.

Figure 5:
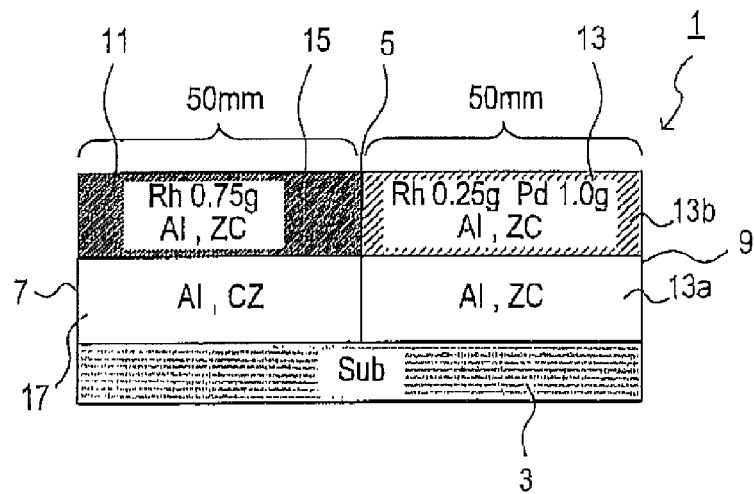
[FIG. 5] is an explanatory diagram showing a structure of an exhaust gas purifying catalyst according to a fifth embodiment.

Embodiment 5 a) An exhaust gas purifying catalyst 1 of an Embodiment 5 has basically the same structure as that of the Embodiment 1, as shown in FIG. 5. The Embodiment 5 is different from the Embodiment 1 in that the downstream portion 13 is divided into the downstream portion inside layer 13a and the downstream portion outside layer 13b, and in that 0.25 g of Rh and 1.0 g of Pd as the noble metals are contained only in the downstream portion outside layer 13b.

b) Although a method of manufacturing the exhaust gas purifying catalyst 1 of the Embodiment 5 is basically the same as in the Embodiment 1, there are some differences in a method of forming the downstream portion 13. A description will be made below mainly with respect to the differences.

First, a slurry S5A and a slurry S5B to be used as slurries to form the downstream portion 13 were prepared by mixing below listed components, respectively.

(Slurry S5A)
    alumina: 25 g
    Zr rich composite oxide (with a relative proportion of $ZrO_2$ of 80 wt %): 25 g
    water: 50 g (Slurry S5B)
    alumina: 25 g
    Zr rich composite oxide (with a relative proportion of $ZrO_2$ of 80 wt %): 25 g Rh nitrate solution: an amount containing 0.25 g of Rh
Pd nitrate solution: an amount containing 1.0 g of Pd
water: 50 g Then, the upstream portion inside layer 17 and the upstream portion outside layer 15 were formed using the slurry S1A and the slurry S1B in a same manner as in the Embodiment 1.

Subsequently, 50 g of the slurry S5A was applied to coat the cell of the substrate 3 over an area of 50 mm from the exit end 9 (that is, a portion not coated with the slurry S1A or S1B), dried at 250° C. for an hour and calcined at 500° C. for an hour. By this step, the downstream portion inside layer 13a was formed.

Further, 51.25 g of the slurry S5B (containing 0.25 g of Rh and 1.0 g of Pd) was applied to coat the area previously coated with the slurry S5A, dried and calcined. Thus, the downstream portion outside layer 13b was formed, and the exhaust gas purifying catalyst 1 was completed.

Embodiment 6

Figure 6:
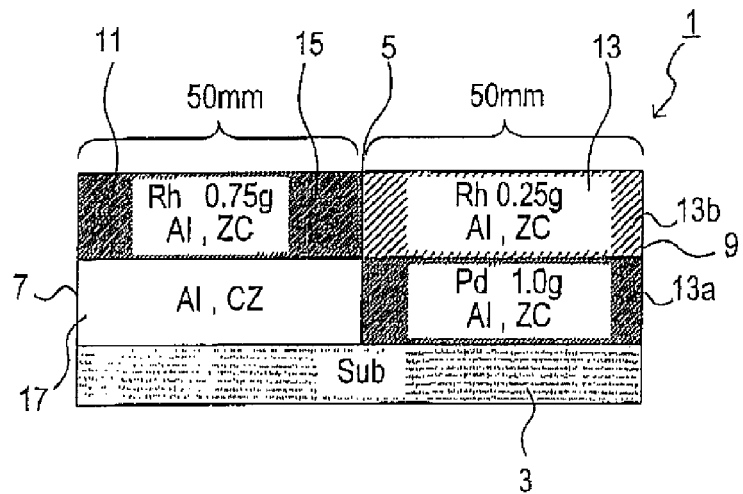
[FIG. 6] is an explanatory diagram showing a structure of an exhaust gas purifying catalyst according to a sixth embodiment.

An exhaust gas purifying catalyst 1 of an Embodiment 6 has basically the same structure as that of the Embodiment 1, as shown in FIG. 6. The Embodiment 6 is different from the Embodiment 1 in that 1.0 g of Pd as the noble metal is contained in the downstream portion inside layer 13a and in that 0.25 g of Rh is the only noble metal contained in the downstream portion outside layer 13b.

A method of manufacturing the exhaust gas purifying catalyst 1 of the Embodiment 6 is basically the same as in the Embodiment 5. In the Embodiment 6, a slurry S6A prepared by mixing below listed components was used in place of the slurry S5A. Also, a slurry S6B prepared by mixing below listed components was used in place of the slurry S5B.

(Slurry S6A)
    alumina: 25 g
    Zr rich composite oxide (with a relative proportion of $ZrO_2$ of 80 wt %): 25 g
    Pd nitrate solution: an amount containing 1.0 g of Pd
    water: 50 g (Slurry S6B)
    alumina: 25 g
    Zr rich composite oxide (with a relative proportion of $ZrO_2$ of 80 wt %): 25 g
    Rh nitrate solution: an amount containing 0.25 g of Rh
    water: 50 g In the Embodiment 6, 51 g of the slurry S6A (containing 1.0 g of Pd) was applied, in place of the slurry S5A, to coat the cell of the substrate 3 over an area of 50 mm from the exit end 9, dried and calcined to form the downstream portion inside layer 13a.

Subsequently, 50.25 g of the slurry S6B (containing 0.25 g of Rh) was applied to coat the area previously coated with the slurry S6A, dried and calcined to form the downstream portion outside layer 13b. A method of forming the upstream portion 11 is the same as in the Embodiment 5.

Embodiment 7

Figure 7:
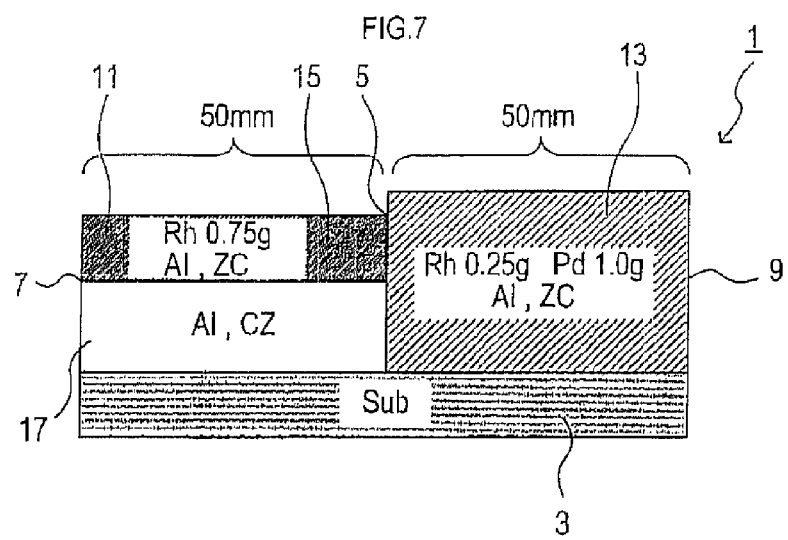
[FIG. 7] is an explanatory diagram showing a structure of an exhaust gas purifying catalyst according to a seventh embodiment.

An exhaust gas purifying catalyst 1 of an Embodiment 7 has basically the same structure as that of the Embodiment 1, as shown in FIG. 7. The Embodiment 7 is different from the Embodiment 1 in that a coating amount in the upstream portion 11 is 50.75 g which is smaller than a coating amount of 101.25 g in the downstream portion 13.

A method of manufacturing the exhaust gas purifying catalyst 1 of the Embodiment 7 is basically the same as in the Embodiment 1. In the Embodiment 7, a coating amount of the slurry S1A is 25 g for forming the upstream portion inside layer 17 and a slurry S7A prepared by mixing below listed components was used in place of the slurry S1B.

(Slurry S7A)
    alumina: 12.5 g
    Zr rich composite oxide (with a relative proportion of $ZrO_2$ of 80 wt %): 12.5 g
    Rh nitrate solution: an amount containing 0.75 g of Rh
    water: 25 g In the Embodiment 7, 25 g of the slurry S1A was applied to coat the cell of the substrate 3 over an area of 50 mm from the entrance end 7, dried at 250° C. for an hour and calcified at 500° C. for an hour. Thus, the upstream portion inside layer 17 was formed.

Subsequently, 25.75 g of the slurry S7A (containing 0.75 g of Rh) was applied to coat the area previously coated with the slurry S1A, dried and calcined. Thus, the upstream portion outside layer 15 was formed. A method of forming the downstream portion 13 is the same as in the Embodiment 1.

Embodiment 8

Figure 8:
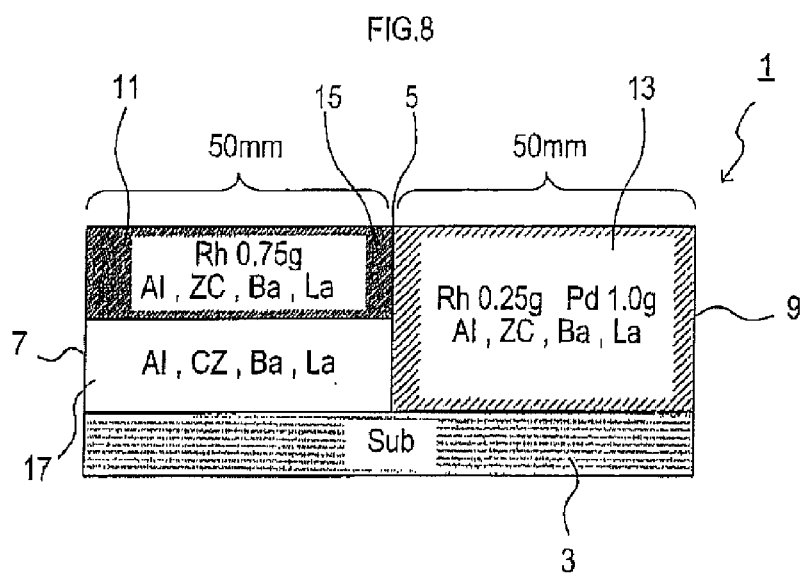
[FIG. 8] is an explanatory diagram showing a structure of an exhaust gas purifying catalyst according to an eighth embodiment.

An exhaust gas purifying catalyst 1 of an Embodiment 8 has basically the same structure as that of the Embodiment 1, as shown in FIG. 8. The Embodiment 8 is different from the Embodiment 1 in that each of the upstream portion inside layer 17, the upstream portion outside layer 15 and the downstream portion 13 contains barium and lanthanum.

A method of manufacturing the exhaust gas purifying catalyst 1 of the Embodiment 8 is basically the same as in the Embodiment 1. In the Embodiment 8, a slurry S8A prepared by mixing below listed components was used in place of the slurry S1A. A slurry S8B prepared by mixing below listed components was used in place of the slurry S1B. Also, a slurry S8C prepared by mixing below listed components was used in place of the slurry S1C.

(Slurry S8A)
    alumina: 25 g
    Ce rich composite oxide (with a relative proportion of $CeO_2$ of 80 wt %): 25 g
    barium sulphate: 5 g
    lanthanum carbonate: 2.5 g
    water: 57.5 g (Slurry S8B)
    alumina: 25 g
    Zr rich composite oxide (with a relative proportion of $ZrO_2$ of 80 wt %): 25 g
    barium sulphate: 5 g
    lanthanum carbonate: 2.5 g
    Rh nitrate solution: an amount containing 0.75 g of Rh
    water: 82.5 g (Slurry S8C)
    alumina: 50 g
    Zr rich composite oxide (with a relative proportion of $ZrO_2$ of 80 wt %): 50 g
    barium sulphate: 10 g
    lanthanum carbonate: 5 g
    Rh nitrate solution: an amount containing 0.25 g of Rh
    Pd nitrate solution: an amount containing 1.0 g of Pd
    water: 115 g In the Embodiment 8, 57.5 g of the slurry S8A was applied, in place of the slurry S1A, to coat the cell of the substrate 3 over an area of 50 mm from the entrance end 7, dried and calcined to form the upstream portion inside layer 17.

Then, 58.25 g of the slurry S8B (containing 0.75 g of Rh) was applied to coat the area previously coated with the slurry S8A, dried and calcined to form the upstream portion outside layer 15.

Subsequently, 116.25 g of the slurry S8C (containing 0.25 g of Rh and 1.0 g of Pd) was applied to coat the cell of the substrate 3 over an area of 50 mm from the exit end 9, dried and calcined to form the downstream portion 13.

Embodiment 9

Figure 9:
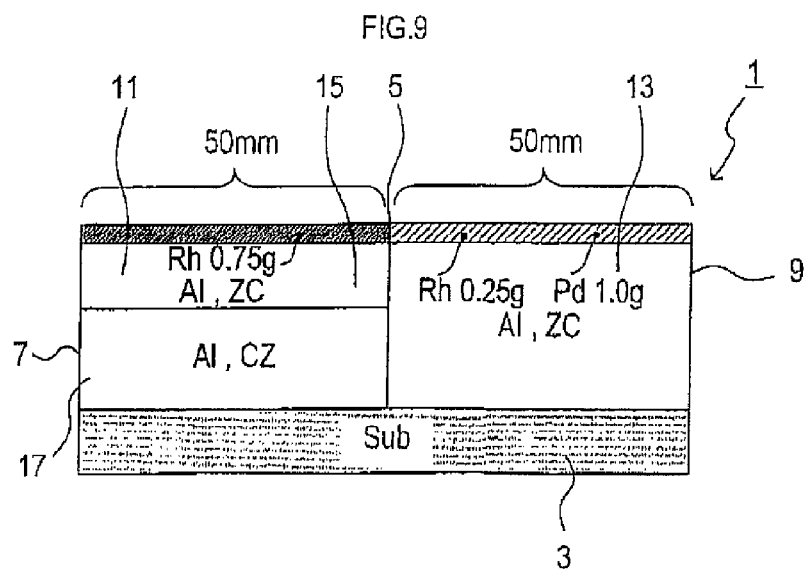
[FIG. 9] is an explanatory diagram showing a structure of an exhaust gas purifying catalyst according to a ninth embodiment.

An exhaust gas purifying catalyst 1 of an Embodiment 9 has basically the same structure as that of the Embodiment 1, as shown in FIG. 9. However, Rh as the noble metal is contained mainly in a surface region (in an external region) of the upstream portion outside layer 15. Specifically, a thickness of the upstream portion outside layer 15 is 100 μm, and all the Rh is supported in a region from the surface of the upstream portion outside layer 15 to a depth of 10 μm.

The exhaust gas purifying catalyst 1 according to the Embodiment 9 was manufactured as below.

Firstly, 50 g of the slurry S1A was applied to coat the cell of the substrate 3 over an area of 50 mm from the entrance end 7 in a same manner as in the Embodiment 1, dried at 250° C. for an hour, and calcined at 500° C. for an hour, to form the upstream portion inside layer 17.

Then, 50 g of the slurry S5A was applied to coat the area previously coated with the slurry S1A, dried at 250° C. for an hour, and calcined at 500° C. for an hour. After the calcination, 0.75 g of Rh was made to be supported in the area previously coated with the slurry S1A and the slurry S5A using an Rh nitrate solution, and dried at 250° C. for an hour.

Subsequently, 100 g of the slurry S5A was applied to coat the cell of the substrate 3 over an area of 50 mm from the exit end 9, dried at 250° C. for an hour and calcined at 500° C. for an hour. After the calcination, 0.25 g of Rh and 1.0 g of Pt were made to be supported in the area previously coated with the slurry S5A (over the area of 50 mm from the exit end 9) using an Rh nitrate solution and a Pt nitrate solution, and dried at 250° C. for an hour. Thus, the exhaust gas purifying catalyst 1 was completed

COMPARATIVE EXAMPLE 1

Figure 10:
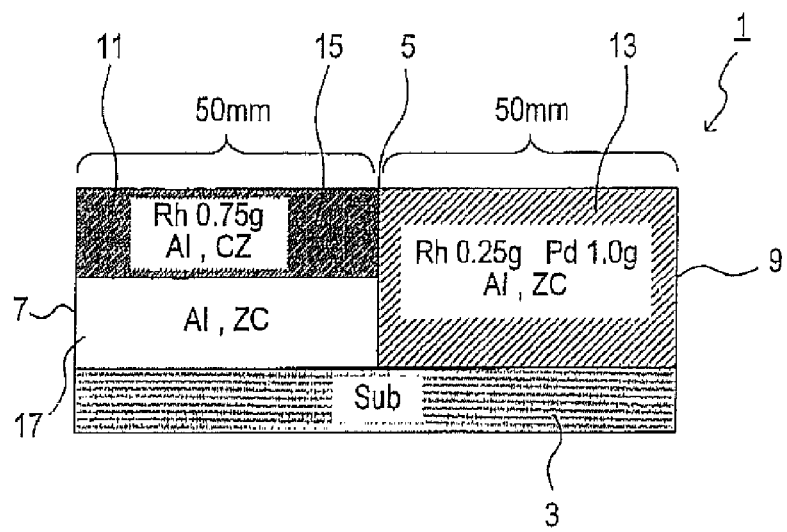
[FIG. 10] is an explanatory diagram showing a structure of an exhaust gas purifying catalyst according to a comparative example 1.

A description will now be given on a structure of an exhaust gas purifying catalyst 1 of a Comparative Example 1 with reference to FIG. 10. The exhaust gas purifying catalyst 1 includes the catalyst coating layer 5 on a cell surface of the same substrate 3 as in the Embodiment 1. The catalyst coating layer 5 includes the upstream portion inside layer 17, the upstream portion outside layer 15 and the downstream portion 13 as in the Embodiment 1. The upstream portion inside layer 17 includes alumina and a Zr rich composite oxide. The upstream portion outside layer 15 includes Rh (0.75 g) as the noble metal, alumina and a Ce rich composite oxide. The downstream portion 13 includes Rh (0.25 g) and Pd (1.0 g) as the noble metal, alumina and a Zr rich composite oxide.

b) A description will now be given on a method of manufacturing the exhaust gas purifying catalyst 1 of the Comparative Example 1.

Firstly, 50 g of the slurry S5A was applied to coat the cell of the substrate 3 over an area of 50 mm from the entrance end 7, dried at 250° C. for an hour, and calcined at 500° C. for an hour, to form the upstream portion inside layer 17.

Then, 50.75 g of a below specified slurry SP1 (containing 0.75 g of Rh) was applied to coat the area previously coated with the slurry S5A, dried at 250° C. for an hour, and calcined at 500° C. for an hour, to form the upstream portion outside layer 15.

(Slurry SP1)
  alumina: 25 g
  Ce rich composite oxide (with a relative proportion of $CeO_2$ of 80 wt %): 25 g
  Rh nitrate solution: an amount containing 0.75 g of Rh
  water: 50 g Subsequently, 101.25 g of the slurry S1C (containing 0.25 g of Rh and 1.0 g of Pd) was applied to coat the cell of the substrate 3 over an area of 50 mm from the exit end 9, dried at 250° C. for an hour and calcined at 500° C. for an hour, to form the downstream portion 13.

COMPARATIVE EXAMPLE 2

Figure 11:
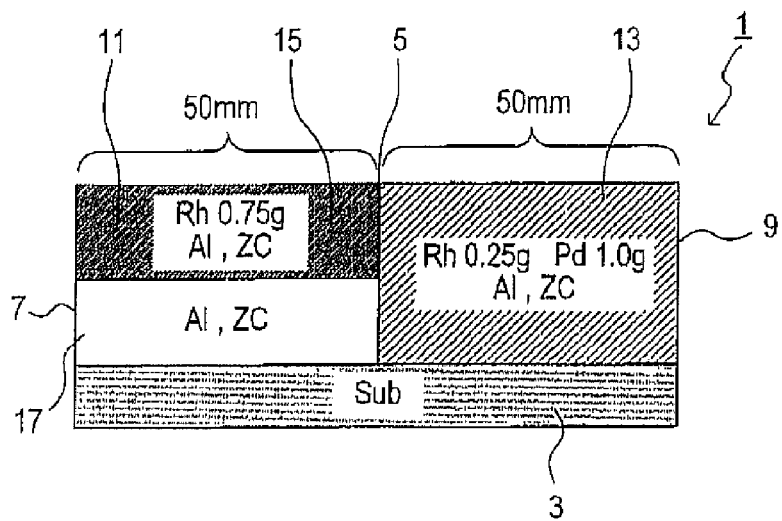
[FIG. 11] is an explanatory diagram showing a structure of an exhaust gas purifying catalyst according to a comparative example 2.

An exhaust gas purifying catalyst 1 of a Comparative Example 2 has basically the same structure as that of the Comparative Example 1, as shown in FIG. 11. The Comparative Example 2 is different from the Comparative Example 1 in that the upstream portion outside layer 15 includes a Zr rich composite oxide instead of a Ce rich composite oxide.

A method of manufacturing the exhaust gas purifying catalyst 1 of the Comparative Example 2 is basically the same as in the Comparative Example 1. In the Comparative Example 2, 50.75 g of the slurry S1B (containing 0.75 g of Rh) was applied in place of the slurry SP1 in order to form the upstream portion outside layer 15.

COMPARATIVE EXAMPLE 3

Figure 12:
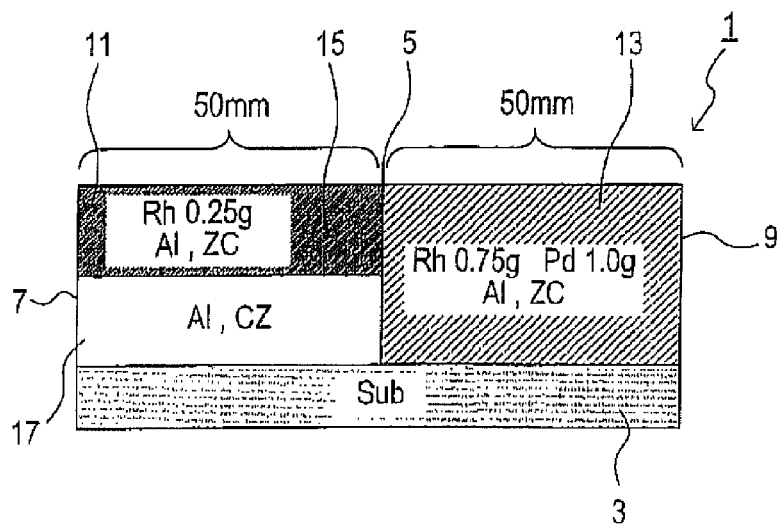
[FIG. 12] is an explanatory diagram showing a structure of an exhaust gas purifying catalyst according to a comparative example 3.

An exhaust gas purifying catalyst 1 of a Comparative Example 3 has basically the same structure as that of the Comparative Example 1, as shown in FIG. 12. The Comparative Example 3 is different from the Comparative Example 1 in that an amount of Rh contained in the upstream portion outside layer 15 is 0.25 g and an amount of Rh contained in the downstream portion 13 is 0.75 g. The Comparative Example 3 is also different in that the upstream portion inside layer 17 contains a Ce rich composite oxide instead of a Zr rich composite oxide, and the upstream portion outside layer 15 contains a Zr rich composite oxide instead of a Ce rich composite oxide.

A method of manufacturing the exhaust gas purifying catalyst 1 of the Comparative Example 3 is basically the same as in the Comparative Example 1, but is partially different. Specifically, 50 g of the slurry S1A was applied in place of the slurry S5A in order to form the upstream portion inside layer 17. Also, 50.25 g of the slurry S6B (containing 0.25 g of Rh) was applied in place of the slurry SP1 in order to form the upstream portion outside layer 15. Further, 101.75 g of a below specified slurry SP3 (containing 0.75 g of Rh and 1.0 g of Pd) was applied in place of the slurry S1C in order to form the downstream portion 13.

(Slurry SP3)
  alumina: 50 g
  Zr rich composite oxide (with a relative proportion of $ZrO_2$ of 80 wt %): 50 g
  Rh nitrate solution: an amount containing 0.75 g of Rh
  Pd nitrate solution: an amount containing 1.0 g of Pd
  water: 75 g

COMPARATIVE EXAMPLE 4

Figure 13:
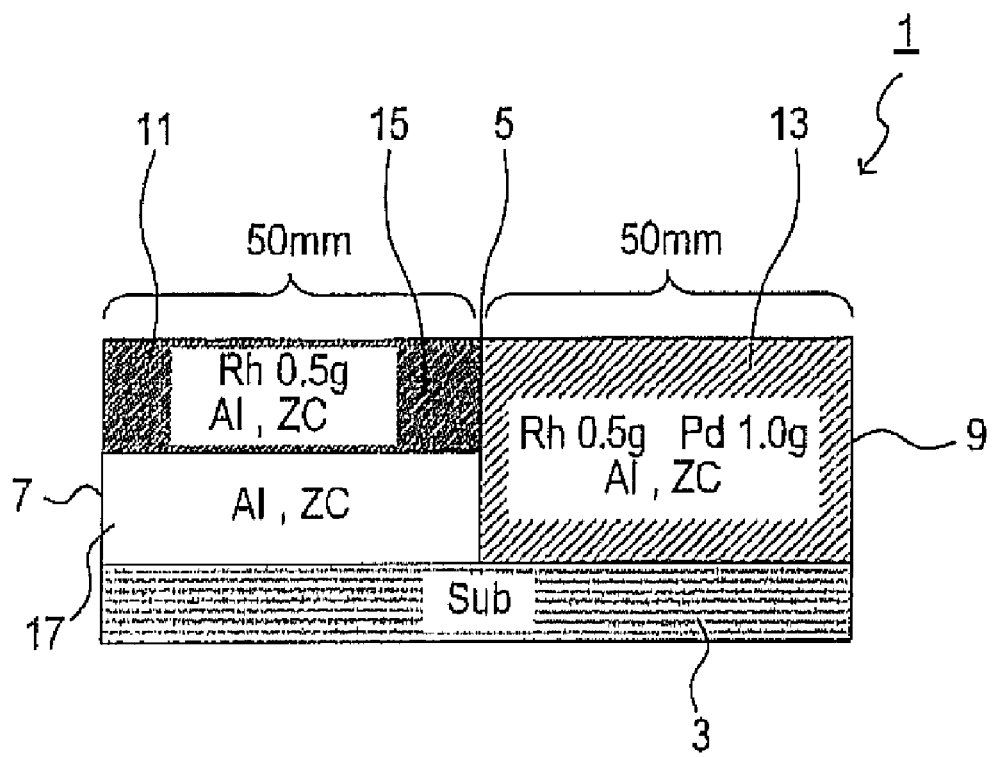
[FIG. 13] is an explanatory diagram showing a structure of an exhaust gas purifying catalyst according to a comparative example 4.

An exhaust gas purifying catalyst 1 of a Comparative Example 4 has basically the same structure as that of the Comparative Example 1, as shown in FIG. 13. The Comparative Example 4 is different from the Comparative Example 1 in that an amount of Rh contained in the upstream portion outside layer 15 is 0.5 g and the refractory inorganic oxide is a Zr rich composite oxide, and in that an amount of Rh contained in the downstream portion 13 is 0.5 g.

A method of manufacturing the exhaust gas purifying catalyst 1 of the Comparative Example 4 is basically the same as in the Comparative Example 1, but is partially different. Specifically, 50.5 g of a slurry SP4A (containing 0.5 g of Rh)

specified below was applied in place of the slurry SP1 in order to form the upstream portion outside layer 15.

(Slurry SP4A)
- alumina: 25 g
- Zr rich composite oxide (with a relative proportion of $ZrO_2$ of 80 wt %): 25 g
- Rh nitrate solution: an amount containing 0.5 g of Rh
- water: 50 g Also, 101.5 g of a slurry SP4B (containing 0.5 g of Rh and 1.0 g of Pd) specified below was applied in place of the slurry S1C in order to form the downstream portion 13.

(Slurry SP4B)
- alumina: 50 g
- Zr rich composite oxide (with a relative proportion of $ZrO_2$ of 80 wt %): 50 g
- Rh nitrate solution: an amount containing 0.5 g of Rh
- Pd nitrate solution: an amount containing 1.0 g of Pd
- water: 100 g

COMPARATIVE EXAMPLE 5

Figure 14:
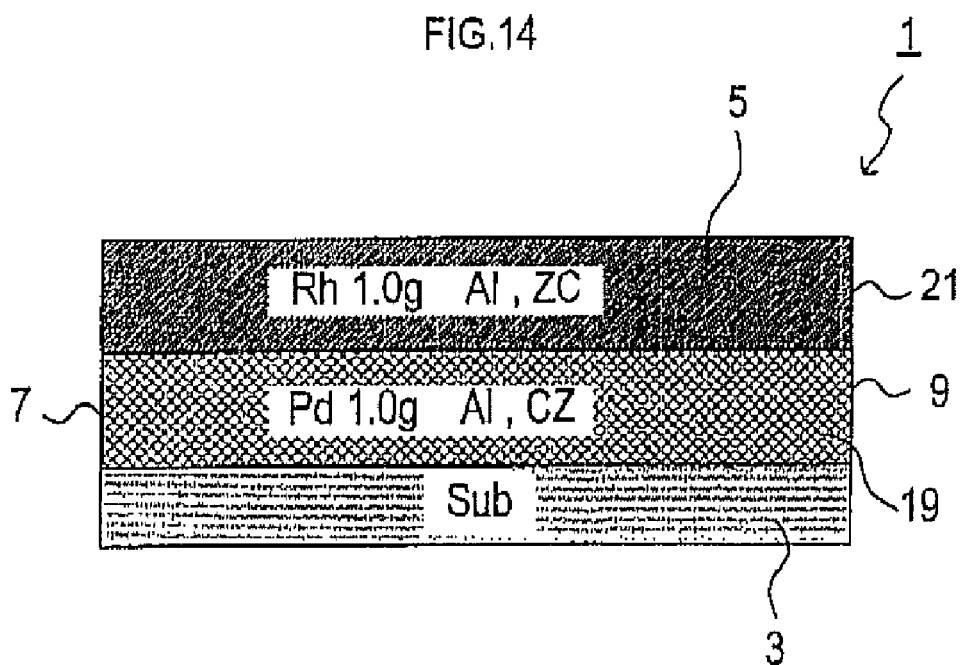
[FIG. 14] is an explanatory diagram showing a structure of an exhaust gas purifying catalyst according to a comparative example 5.

A structure of an exhaust gas purifying catalyst 1 of a Comparative Example 5 includes a catalyst coating layer 5 formed on the cell surface of the same substrate 3 as in the Embodiment 1, as shown in FIG. 14. Unlike the Embodiments 1 through 9, the catalyst coating layer 5 is not divided into an upstream portion and a downstream portion. The catalyst coating layer 5 has a two-layer structure including an inside layer 19 and an outside layer 21. The inside layer 19 contains alumina, a Ce rich composite oxide and 1.0 g of Pd as the noble metal. The outside layer 21 contains alumina, a Zr rich composite oxide and 1.0 g of Rh as the noble metal.

The exhaust gas purifying catalyst 1 of the Comparative Example 5 may be manufactured as described below.

Firstly, 101.0 g of a slurry SP5A (containing 1.0 g of Pd) specified below was applied to coat the entire cell of the same substrate 3 as in the Embodiment 1, dried at 250° C. for an hour, and calcined at 500° C. for an hour, to thereby form the inside layer 19.

(Slurry SP5A)
- alumina: 50 g
- Ce rich composite oxide (with a relative proportion of $CeO_2$ of 80 wt %): 50 g
- Pd nitrate solution: an amount containing 1.0 g of Pd
- water: 100 g Then, 101.0 g of a slurry SP5B (containing 1.0 g of Rh) specified below was applied to coat an area previously coated with the slurry SP5A, dried at 250° C. for an hour, and calcined at 500° C. for an hour, to thereby form the outside layer 21.

(Slurry SP5B)
- alumina: 50 g
- Zr rich composite oxide (with a relative proportion of $ZrO_2$ of 80 wt %): 50 g
- Rh nitrate solution: an amount containing 1.0 g of Rh
- water: 100 g Ignition performance was tested regarding each of the Embodiments 1 through 9 and the Comparative Examples 1 through 5.

(Test Method)

After conducting a durability test corresponding to 80,000 Km run, each of the exhaust gas purifying catalysts according to the respective embodiments and comparative examples was mounted on an actual vehicle having an engine of 2.0 L displacement. HC, CO and NOx emissions were measured after conducting a running test according to the Japanese 11 mode test.

(Test Results)

Table 1 shows the test results.

TABLE 1

| Sample | HC emission (g/test) | CO emission (g/test) | NOx emission (g/test) |
|---|---|---|---|
| Embodiment 1 | 0.44 | 1.41 | 0.32 |
| Embodiment 2 | 0.49 | 1.38 | 0.30 |
| Embodiment 3 | 0.47 | 1.43 | 0.37 |
| Embodiment 4 | 0.40 | 1.33 | 0.26 |
| Embodiment 5 | 0.43 | 1.40 | 0.30 |
| Embodiment 6 | 0.39 | 1.35 | 0.28 |
| Embodiment 7 | 0.40 | 1.33 | 0.29 |
| Embodiment 8 | 0.42 | 1.37 | 0.27 |
| Embodiment 9 | 0.37 | 1.30 | 0.27 |
| Comparative Example 1 | 0.66 | 1.87 | 0.63 |
| Comparative Example 2 | 0.58 | 1.65 | 0.57 |
| Comparative Example 3 | 0.51 | 1.59 | 0.50 |
| Comparative Example 4 | 0.62 | 1.80 | 0.58 |
| Comparative Example 5 | 0.70 | 2.00 | 0.66 |

As shown in Table 1, the HC, CO and NOx emissions of the exhaust gas purifying catalysts according to the Embodiments 1 through 9 are remarkably low as compared with those of the Comparative Examples 1 through 5. Specifically, the emissions of the exhaust gas purifying catalyst according to the Embodiment 4 are further low, since Pd is contained in the upstream portion inside layer 17. Also, the emissions of the exhaust gas purifying catalyst according to the Embodiment 6 are further low, since the downstream portion 13 is divided into the downstream portion inside layer 13a and the downstream portion outside layer 13b, Pd is contained in the downstream portion inside layer 13a, and Rh is contained in the downstream portion outside layer 13b. The emissions of the exhaust gas purifying catalyst according to the Embodiment 7 are further low, since the coating amount per unit volume in the upstream portion 11 is smaller than that in the downstream portion 13. Also, the emissions of the exhaust gas purifying catalyst according to the Embodiment 9 are further low, since the noble metal is contained mainly in the surface region of the upstream portion outside layer 15 and the downstream portion 13.

From the above experiments, it was confirmed that the ignition performance of each of the exhaust gas purifying catalysts according to the Embodiments 1 through 9 is excellent.

It is to be understood that the present invention should not be limited to the above described embodiments, but may be practiced in various forms within the scope not departing from the present invention.

The invention claimed is:

1. An exhaust gas purifying catalyst comprising:
   a catalyst substrate; and
   a catalyst coating layer containing a noble metal and a refractory inorganic oxide, and formed on the catalyst substrate,
   wherein the catalyst coating layer includes an upstream portion located upstream in a flow direction of an exhaust gas and a downstream portion located downstream in the flow direction of the exhaust gas,
   the upstream portion is separate from and abuts the downstream portion and at least the upstream portion has a layered structure including an upstream portion inside layer and an upstream portion outside layer, the upstream portion inside layer contains a cerium-zirconium composite oxide in which a relative proportion of $CeO_2$ is 50 to 95 wt %, as the refractory inorganic oxide, and the upstream portion outside layer contains a cerium-zirconium composite oxide in which a relative proportion of $ZrO_2$ is 50 to 95 wt %, as the refractory inorganic oxide, and the upstream portion outside layer and the downstream portion contain Rh as the noble metal, and an amount of Rh contained in the upstream portion outside layer is larger than an amount of Rh contained in the downstream portion and the amount of Rh contained in the downstream portion is greater than zero (0).

2. The exhaust gas purifying catalyst according to claim 1, wherein the downstream portion contains, as the refractory inorganic oxide, a cerium-zirconium composite oxide in which a relative proportion of $ZrO_2$ is 50 to 95 wt %.

3. The exhaust gas purifying catalyst according to claim 1, wherein the downstream portion has a layered structure including a downstream portion inside layer and a downstream portion outside layer, and the downstream portion inside layer and the downstream portion outside layer are different in at least one of (A) and (B):

(A) at least one of a type and a concentration of the noble metal; and (B) a type of the refractory inorganic oxide.

4. The exhaust gas purifying catalyst according to claim 3, wherein the downstream portion outside layer contains Rh as the noble metal.

5. The exhaust gas purifying catalyst according to claim 1, wherein a coating amount per unit volume of the catalyst coating layer is smaller in the upstream portion than in the downstream portion.

6. The exhaust gas purifying catalyst according to claim 1, wherein the noble metal is contained mainly in an external region of the upstream portion outside layer.

7. The exhaust gas purifying catalyst according to claim 3, wherein a coating amount per unit volume of the catalyst coating layer is smaller in the upstream portion than in the downstream portion.

8. The exhaust gas purifying catalyst according to claim 3, wherein the noble metal is contained mainly in an external region of the upstream portion outside layer.

9. The exhaust gas purifying catalyst according to claim 4, wherein a coating amount per unit volume of the catalyst coating layer is smaller in the upstream portion than in the downstream portion.

10. The exhaust gas purifying catalyst according to claim 4, wherein the noble metal is contained mainly in an external region of the upstream portion outside layer.

11. The exhaust gas purifying catalyst according to claim 1, wherein the upstream portion inside layer contains Pd.

12. The exhaust gas purifying catalyst according to claim 1, wherein the downstream portion inside layer contains Pd.

13. The exhaust gas purifying catalyst according to claim 1, wherein the cerium-zirconium composite oxide in the upstream portion inside layer facilitates adsorption of exhaust gas components and the Rh contained in the upstream portion outside layer facilitates decomposition of the adsorbed exhaust gas components.

* * * * *